(12) United States Patent
White et al.

(10) Patent No.: US 10,228,225 B2
(45) Date of Patent: Mar. 12, 2019

(54) PASSIVE IMPACT SENSOR FOR HIGH VELOCITY PROJECTILES

(71) Applicant: Raytheon Company, Waltham, MA (US)

(72) Inventors: Ryan D. White, Tucson, AZ (US); Michael D. Stokes, Tucson, AZ (US); Bruce Freeman, Albuquerque, NM (US)

(73) Assignee: Raytheon Company, Waltham, MA (US)

( * ) Notice: Subject to any disclaimer, the term of this patent is extended or adjusted under 35 U.S.C. 154(b) by 242 days.

(21) Appl. No.: 15/277,387

(22) Filed: Sep. 27, 2016

(65) Prior Publication Data

US 2018/0087885 A1 Mar. 29, 2018

(51) Int. Cl.
*F42C 1/10* (2006.01)
*F42C 19/07* (2006.01)
(Continued)

(52) U.S. Cl.
CPC ............... *F42C 1/10* (2013.01); *F42C 1/00* (2013.01); *F42C 19/07* (2013.01); *G01P 15/08* (2013.01)

(58) Field of Classification Search
CPC .......... F42C 1/00; F42C 11/02; F42C 11/008; F42C 19/07; G01P 15/08; G01P 15/0819
See application file for complete search history.

(56) References Cited

U.S. PATENT DOCUMENTS 3,256,817 A   10/1951   Rabinow et al.
3,922,968 A * 12/1975   Conger .................... F42B 12/36
                                                          102/207
(Continued)

FOREIGN PATENT DOCUMENTS

WO       WO-9311612 A1 *  6/1993   ............ F24B 12/365

OTHER PUBLICATIONS

Hasebe et al., "Position Sensitive element for Hypervelocity Microparticles Using a Piezoelectric Plate," Japanese Journal of Applied Physics, May 2008.
(Continued)

*Primary Examiner* — Benjamin P Lee
(74) *Attorney, Agent, or Firm* — Eric A. Gifford (57) ABSTRACT

A passive impact sensor for a projectile configured to explode, destroy with kinetic energy, embed or pass through an object with a closing velocity greater than 1,000 m/s. The passive impact sensor includes an energy generating system comprised of a crystalline structure that stores latent polarized electrical energy. The crystalline structure is responsive to an impact generated shock wave that propagates at least partially through the crystalline structure to consume and depolarize the crystalline structure and release at least a portion of the stored energy to generate a voltage pulse across output terminals. An onboard antenna is configured to transmit an RF pulse responsive to the voltage pulse (direct or integrated) external to the impact sensor (and projectile) before the sensor is destroyed by the shock wave. Multiple energy generating systems can be positioned either together or fore and aft and their voltage pulses summed to transmit the RF pulse. The benefits of this device include the ability to determine impact force, impact velocity, impact angle, target mass, target density, and direct or glancing impact.

18 Claims, 8 Drawing Sheets

(51) Int. Cl.
*G01P 15/08* (2006.01)
*F42C 1/00* (2006.01)

(56) References Cited

U.S. PATENT DOCUMENTS

| | | | |
|---|---|---|---|
| 4,020,765 A | 5/1977 | Glass et al. | |
| 4,723,087 A * | 2/1988 | Fox | F42C 11/02 |
| | | | 310/329 |
| 4,793,256 A | 12/1988 | Webb | |
| 5,280,751 A * | 1/1994 | Muirhead | F42B 12/365 |
| | | | 102/210 |
| 5,301,613 A * | 4/1994 | Muirhead | F42C 11/02 |
| | | | 102/210 |
| 6,138,516 A * | 10/2000 | Tillman | G01H 1/16 |
| | | | 340/429 |
| 7,434,516 B1 * | 10/2008 | Drotar | F42B 12/36 |
| | | | 102/293 |
| 7,690,288 B2 * | 4/2010 | Calico | F42C 11/02 |
| | | | 102/210 |
| 7,999,445 B2 | 8/2011 | Baird et al. | |
| 8,307,694 B1 * | 11/2012 | Kiefer | G01S 5/06 |
| | | | 73/12.01 |
| 9,354,136 B1 * | 5/2016 | Philpot | G01M 5/0066 |
| 9,797,697 B2 * | 10/2017 | Wright | F42B 12/02 |
| 10,024,696 B2 * | 7/2018 | Crawford | F42B 30/006 |
| 2007/0000376 A1 * | 1/2007 | Calico | F42C 11/02 |
| | | | 89/1.14 |
| 2010/0307363 A1 * | 12/2010 | Chishinski | F42C 1/10 |
| | | | 102/216 |
| 2016/0356688 A1 * | 12/2016 | Wright | F42B 12/02 |
| 2017/0328742 A1 * | 11/2017 | Crawford | F42B 30/006 |
| 2018/0135955 A1 * | 5/2018 | Greiner | F42C 1/00 |

OTHER PUBLICATIONS

Hasebe et al., "Real-time detector for hypervelocity microparticles using piezoelectric material," Advances in Space Research, Jan. 2004.

Altgilbers et al., Explosive Pulsed Power: An Enabling Technology, Proceedings of the 2nd Euro-Asian Pulsed Power Conference, Vilnius, Lithuania, Sep. 22-26, 2008.

Holt et al., "Design of Explosive-Drivin Ferroelectric Pulse Generators with Outputs Exceeding 200kV," IEEE, 2005.

Kobayashi et al, "Cosmic Dust Detector Capable of Measuring Hypervelocity Speed Using Piezoelectyric PZT," 42nd Lunar and Planetary Science Conference, 2011.

* cited by examiner

PASSIVE IMPACT SENSOR FOR HIGH VELOCITY PROJECTILES

BACKGROUND OF THE INVENTION

Field of the Invention

This invention relates to impact sensors and more particularly to a passive impact sensor for high velocity impacts that transmits impact data off-projectile.

Description of the Related Art

Shock and impact sensors are devices that detect sudden movements, changes, or severe impacts at a predetermined level and indicate whether that level has been exceeded. Impact sensors are used in applications where it is desirable to know when an impact has occurred. In an ultra-high velocity or hyper-velocity impact, the relative velocities of the colliding objects can range from about 1,000 meters per second (m/s) to about 15,000 m/s with 5000 m/s being roughly the speed of sound in metal. The speed of sound through the metal construction materials of a projectile limits the propagation speed of the shock wave from an impact through the projectile. Under these conditions, the normal working assumptions of conventional technologies used in the art break down. An example of an application that uses this ultra-high velocity is an anti-projectile projectile. During the final flight stage of the projectile, high velocities are used to improve the accuracy and the efficacy of a successful engagement. In the case where it is desirable for a projectile to send a notification that it has had an impact, this event must be sensed, processed on-board, and transmitted after the impact has occurred, but before the projectile is destroyed by the impact. The projectile's impact sensor needs to be able to detect that an impact has occurred before the sensor is destroyed. Related to this, the sensor must be able to trigger a notification message be sent, and the message sent before the transmitter is destroyed.

Conventional techniques use electrical sensors to detect an impact. Conventional techniques require that the shock from the impact arrive at the sensor and the sensor actuates before the sensor is destroyed. If the electrical sensor is positioned at the anticipated area of impact, the sensor will be destroyed on impact, hence unable to send an impact notification message. Another option for an electrical sensor is to position the sensor in an area of the projectile that is not near the area of impact and detect an indication of the impact. This method is not sufficient at ultra-high velocities because the velocity of the destructive shock wave through the projectile structure exceeds the speed of the sound in the materials of which the projectile is constructed, so the sensor is destroyed before being able to detect the impact.

Another option is to use a conductive circuit positioned at the anticipated area of impact and an electrical sensor positioned in a second area of the projectile, away from the anticipated area of impact. An electrical signal, such as a voltage, is supplied through the conductive circuit. The sensor monitors the conductive circuit for a change in the signal being supplied to the circuit. When the projectile impacts, the conductive circuit is destroyed before the sensor is destroyed. When the sensor measures a change in the signal being monitored, the change can be analyzed, and if this change indicates that the circuit has been destroyed, the sensor can trigger an impact notification message. This technique is known in the art and is used to measure impacts at velocities about 1000 m/s, which is much lower than speed of sound in the materials of which the projectile is constructed. At these velocities, the impact results in damage to the conductive circuit, for example breaking of the conductivity of the circuit. The corresponding change, in this example, loss of signal in the circuit, is measured by the sensor, and an impact message can be sent before the sensor is destroyed.

This technique of using a conductive circuit is not sufficient to detect ultra-high velocity projectile impacts because of the type of destruction resulting from the impact. When there is an ultra-high velocity projectile impact, the construction material of the projectile transitions to an indefinite state. The unpredictable effects of an ultra-high velocity impact on electrical circuitry may be because of the possible formation of plasma, or other unpredictable physical phenomena, due to the velocity of the impact exceeding the speed of sound in the material. The operation of a conductive circuit under these conditions cannot be predicted reliably. The destruction of a conductive circuit at ultra-high velocities does not provide a reliable change in the signal. For example, the conductive circuit may short instead of breaking, or may have a non-repeatable response.

US Patent Pub 2010/0307353 entitled "Ultra-high velocity projectile impact sensor" discloses an apparatus for detecting the impact of an ultra-high velocity projectile including: a projectile; at least one optical fiber attached to at least a first area of the projectile; a light source coupled to the at least one optical fiber supplying light into the at least one optical fiber; and a monitor coupled to the at least one optical fiber configured to monitor a property of the light in the at least one optical fiber and positioned in a second area of the projectile. An optical fiber provides a predictable response under the conditions of an ultra-high velocity projectile impact. When the optical fiber is intact, it propagates light and when the fiber is damaged, the light decreases. In the case where the optical fiber is broken or destroyed or even under some conditions of shock and vibration, the light cannot propagate or propagation is decreased through the optical circuit. Referring to FIGS. 2A-2D, schematic examples of some options for optical fiber layout, the optical fiber may be deployed in a variety of configurations. FIGS. 2A-2C are examples of laying out the cable on the substrate in several optional configurations. FIG. 2D is an example of deploying more than one optical fiber cable on a substrate. It is also possible to use more than one substrate.

When a projectile strikes a target, the impact will be at a first area of the projectile. Depending on the design of the projectile, this first area will begin to crush, collapse, fragment, explode, or similar. Given the ultra-high velocity of the impact, high energies are involved and the materials at the first area of the projectile begin to transition to an indefinite and/or unpredictable state. The optical fiber in the first area is possibly deformed, then destroyed, resulting in an interruption to the light propagating through the optical fiber. The shockwave from the impact begins to travel through the projectile from the first area of impact toward the second area farther away from the impact. The velocity of light in fiber is significantly faster than even ultra-high velocity impacts of a projectile with a target. This difference in velocities allows the monitor to detect a change in the light at the second area before the shockwave reaches the second area and damages or destroys the monitor.

Because of the limitations of high velocity impact sensors, techniques for battle damage indication (BDI) are currently limited to off-board sensors that observe an impact of a projectile and a target, and use processing to characterize the impact. Sensor types may include radar systems, optical systems, radiation detectors, etc. These systems may be located on the ground, at sea, on aircraft, on spacecraft, or on satellites. Typical responses measured include the impact flash, the trajectories of the projectile target both prior to and after impact, residual projectile and target motion, any physical breakup or fragmentation that occurs, and any radiation detected as a result of the impact. At best, these off-board impact measurement systems can infer information about the impact.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a passive impact sensor for a projectile configured to explode, destroy with kinetic energy, embed or pass through an object with a closing velocity greater than 1,000 m/s. The passive impact sensor is configured to sense the impact and transmit an RF pulse in which is encoded information characterizing the impact before the sensor is destroyed. This is accomplished without power or on-board processing for the sensor. The RF pulse is received by an off-board antenna and processed to extract impact information and create BDI.

In an embodiment, a passive impact sensor includes a first energy generating system comprised of a crystalline structure that stores latent polarized electrical energy. A first pair of output terminals is coupled to the first energy generating system. The crystalline structure is responsive to an impact generated shock wave that propagates at least partially through the crystalline structure to consume and depolarize the crystalline structure and release at least at least a portion of the stored energy to generate a voltage pulse across the output terminals. An onboard antenna is configured to transmit an RF pulse responsive to the voltage pulse external to the impact sensor (and projectile) before the sensor is destroyed by the shock wave.

In different embodiments, the crystalline structure may be selected from a class of piezoelectric crystals capable of generating voltage pulses in the hundreds of volts or from a class of ferroelectric ceramic crystals capable of generating voltage pulses in the range of tens of volts to over 100 kV, which provide for a greater transmission range of the RF pulse. A partial list of crystals 104 includes quartz, topaz, lead zirconate titanate (PZT), lead magnesium niobate-lead titanate (PMN-PT) and ferroelectric ceramics.

In different embodiments, the crystalline structure is selected and the antenna configured to transmit the RF pulse at a center frequency less than 400 MHz. In an embodiment, the center frequency is between 100-300 MHz.

In different embodiments, one or more crush plates are positioned forward and aft of the crystalline structure to provide a more predictable release of energy from the crystalline structure. The crush plates may be, for example, flat, triangular or parabolic.

In different embodiments, the voltage pulse is either directly transmitted as the RF pulse or integrated using a storage element and released to transmit the RF pulse. In the former, impact information is encoded in the rise time, pulse width and peak of the transmitted RF pulse. In the later, impact information is encoded in the peak, and possibly the tail, of the transmitted RF pulse. The storage element may, for example, store and release energy based on a threshold, a collection time or an energy release rate. The raw pulse provides more information about the impact whereas the integrated pulse has greater transmission range.

In an embodiment, the passive impact sensor includes a co-located pair of energy generating systems (and output terminals) positioned forward on the projectile. One of the systems is configured for direct transmission and one is configured for integrated transmission of their respective voltage pulses. In another embodiment, a $3^{rd}$ energy generating system (and output terminals) is positioned aft on the projectile. The direct and integrated voltage pulses are summed and transmitted as the RF pulse.

In an embodiment the passive impact sensor includes multiple energy generating systems (and output terminals) each of which generates a voltage pulse. These direct voltage pulses, integrated voltage pulses or a hybrid thereof are summed to transmit a peak voltage pulse as the RF pulse. This configuration can increase the transmission range and/or the impact information encoded in the RF pulse.

In an embodiment, the passive impact sensor is configured to both drive the onboard antenna with the voltage pulse to transmit the RF pulse and to detonate a warhead.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a passive impact sensor for a projectile configured to explode, destroy with kinetic energy, embed or pass through an object with a closing velocity greater than 1,000 m/s. The passive impact sensor is configured to sense the impact and transmit an RF pulse in which is encoded information characterizing the impact before the sensor is destroyed. This is accomplished without power or on-board processing for the sensor. The RF pulse is received by an off-board antenna and processed to extract impact information and create BDI.

Figure 1:
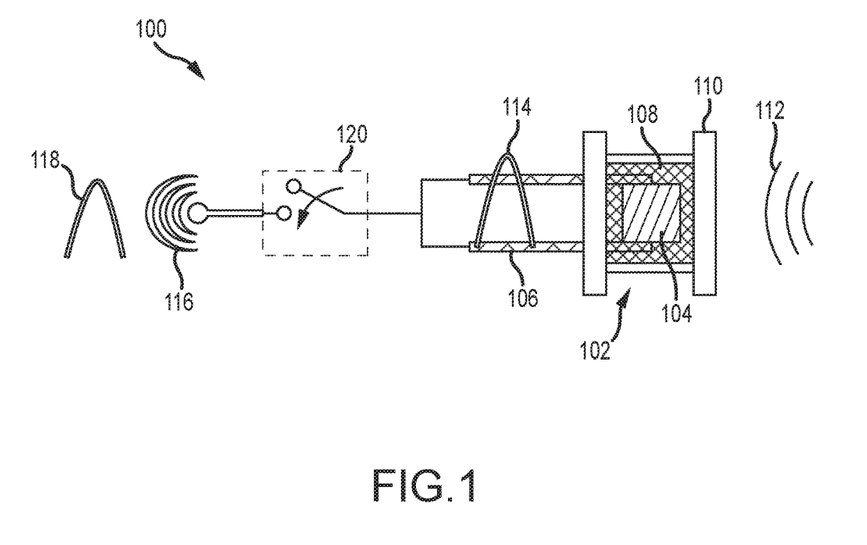
FIG. 1 is a diagram of an embodiment of a passive impact sensor in which latent polarized electrical energy stored in a crystalline structure is released upon impact to transmit an RF pulse.

Referring now to FIG. 1, an embodiment of a passive impact sensor 100 includes an energy generating system 102 comprised of a crystalline structure ("the crystal") 104 that stores latent polarized electrical energy. A pair of output terminals 106 is coupled to the crystalline structure 104. The crystal 104 is suitably placed in a potting agent 108 such as an aluminum oxide (ALOX) material. Rigid crush plates 110 may be positioned fore and aft of crystal 104 to provide a more predictable release of energy from the crystalline structure. The crush plates may be, for example, flat, triangular or parabolic in shape.

The crystal 104 is responsive to an impact generated shock wave 112 that propagates at least partially through the crystalline structure to consume (physically breaking crystalline bond structure) and depolarize the crystalline structure and release at least at least a portion of the stored energy to generate a voltage pulse 114 across the output terminals 106. A partial list of crystals 104 includes quartz, topaz, lead zirconate titanate (PZT), lead magnesium niobate-lead titanate (PMN-PT) and ferroelectric ceramics. Low power crystals such as quartz, topaz, PZT and PMN-PT produce a voltage pulse 114 of up to 1 KV that can be transmitted up to hundreds of miles in atmosphere and further in space. High power crystals such as the ferroelectric ceramics produce a voltage pulse 114 of at least 10 KV that can be transmitted thousands of miles in atmosphere and further in space. The breaking of the bond structure releases a tremendous amount of energy.

An onboard antenna 116 is configured to transmit an RF pulse 118 responsive to the voltage pulse 114 external to the impact sensor (and projectile) before the sensor is destroyed by the shock wave. The antenna is suitably configured to transmit the RF pulse at a center frequency of less than 400 MHz and typically between 100-300 MHz to achieve adequate transmission range.

The sensor may be configured for either "direct" or "integrated" transmission of the energy in voltage pulse 114 in RF pulse 118. In direct transmission, the voltage pulse 114 is transmitted directly as RF pulse 118 (ignoring frequency shifting performed by the antenna). In integrated transmission, a storage element 120 is configured to store energy in the voltage pulse 114 and then to release the stored energy in the RF pulse 118. Since the circuit is closed, the tail of the voltage pulse is also transmitted. Since the impact sensor is "passive", all of the energy for creating and transmitting the RF pulse must be supplied by the energy released by the crystal upon impact. Fortunately, the impact force of the projectile with its target that breaks the crystalline bond structure can release sufficient energy to transmit the RF pulse hundreds to thousands of miles.

The storage element 120 may be configured to trigger the release of energy based on a threshold, a collection time or an energy release rate. In a threshold based configuration, apriori information on the anticipated impact energy as a function of anticipated target mass and velocity would be used to configure the storage element to release the storage energy in a peak RF pulse when the storage energy (voltage) exceeded a voltage threshold sufficient to demonstrate that the impact occurred similar to the expected scenario. This voltage threshold would correspond to the maximum energy releasable by the crystal for a given impact energy as well as design characteristics of the projectile such as crush plates. An exemplary voltage-controlled switch is described in U.S. Pat. No. 7,999,445, which is hereby incorporated by reference. In a time based configuration, the anticipated closing velocity and projectile design would be used to calculate the maximum anticipated energy collection time to ensure maximum charge collection before the storage components are consumed by the impact. The storage element would be configured to store energy for this collection time and then release the stored energy in a peak RF pulse. In an energy release rate storage configuration, the rate of charge buildup would be measured during energy release. After the peak pulse had passed, the tail of the energy pulse would have a lower incremental energy buildup signifying the crystal has released the majority of its energy. The storage element would be configured to store energy until the release rate has decreased and then release the stored energy in a peak RF pulse. The collection time and energy release rate configurations of the storage element should generate an RF pulse for any impact and that RF pulse should more accurately characterize the total energy released by the crystal, hence the impact force.

In direct transmission, the RF pulse is encoded with more information to characterize impact. In integrated transmission, the RF pulse is stronger for greater transmission range. In either mode, all of the energy used to generate and transmit the RF pulse is provided by the energy released from the crystal.

The passive impact sensor is based on principles also used in explosive-driven ferroelectric generators (EDFEGs) and space-based dust sensors. The common principle being that a shock wave can depolarize a crystalline structure and release stored energy. The passive impact sensor is adapted for use with high velocity projectiles that impact objects to sense the impact and transmit an RF that encodes information characterizing that impact before the sensor (and projectile) are destroyed.

An EDFEG uses an explosive detonator to produce a shock wave to release the energy stored in the crystal by consuming the crystal. EDFEGs find multiple uses due to their compact character; charging banks of capacitors, initiation of slapper detonator arrays in nuclear weapons and other devices, driving nuclear fusion reactions, powering pulsed neutron generators, seed power sources for stronger pulse generators (e.g. EPFCGs), electromagnetic pulse generators, electromagnetic weapons, vector inversion generators, etc. U.S. Pat. No. 7,999,445 entitled "Ferroelectric Energy Generator with Voltage-Controlled Switch," discloses an EDFEG and more particularly a VCS for integrating the voltage pulse to produce a peak pulse.

Space-based dust sensors mount piezoelectric crystals on the skin of a satellite to absorb impacts of space dust. The piezoelectric crystal releases energy based on mechanical strain, not consumption of the crystal. As such, the crystal can be re-used to measure space dust impacts. These impact forces may be 10 orders of magnitude less than the projectile impacts (mass of dust compared to the mass of the projectile and target at similar velocities). Accordingly, the strain energy released is miniscule. An on-board sensor/processor measures and processes the generated signal to determine dust velocity. M. Kobayashi et al., "Detector Capable of Measuring Hypervelocity Speed Using Piezoelectric PZT", $42^{nd}$ Lunar and Planetary Science Conference (2011); Nobuyuki Hasebe et al., "Position Sensitive Element for Hypervelocity Microparticles Using a Piezoelectrric Plate", Japanese Journal of Applied Physics May 2008; Nobuyuki Hasebe et al., "Real-Time Detector for Hypervelocity Microparticles using Piezoelectric Material", Advances in Space Research January 2004.

Figure 2:
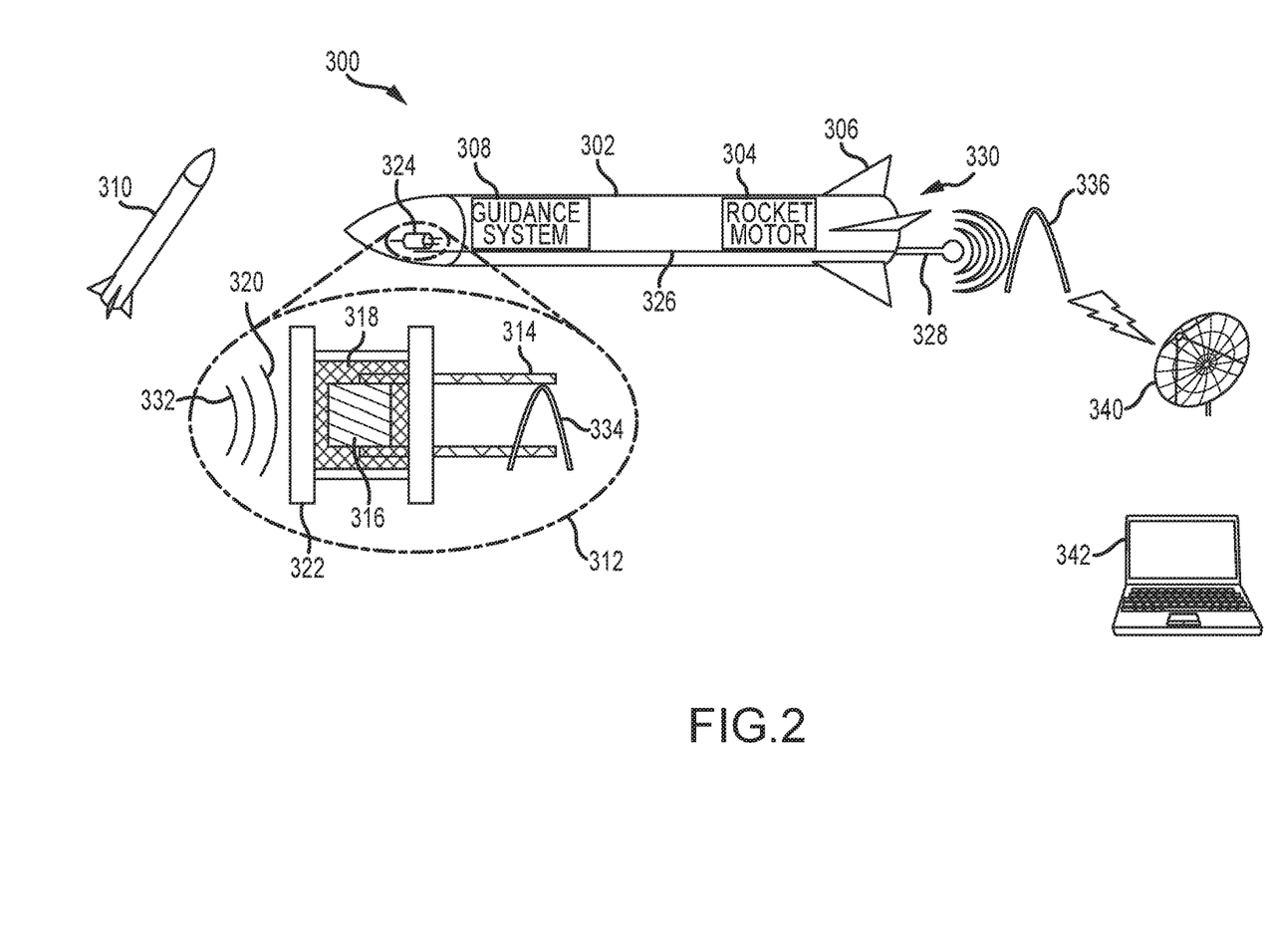
FIG. 2 is a diagram of an embodiment of a high velocity projectile with a passive impact sensor.

Referring now to FIG. 2, an embodiment of a high velocity projectile 300 includes a fuselage 302, a rocket motor 304 configured to produce velocities in excess of 1,000 m/s, aerodynamic control surfaces 306 for stabilization and navigation and a guidance system 308 configured to control the aerodynamic control surfaces 306 to navigate the projectile to explode, destroy with kinetic energy, embed or pass through a target 310 with a closing velocity greater than 1,000 m/s. The guidance system may include, for example, one or more of GPS, inertial navigation or visible/IR/RF seekers.

A passive impact sensor 312 includes a pair of output terminals 314 coupled to a crystal 316 in a potting agent 318 that stores latent polarized electrical energy. Rigid crush plates 320 and 322 are positioned fore and aft of crystal 316 to provide a more predictable release of energy from the crystalline structure. Crystal 316 is positioned forward in the projectile's nosecone 324 absorb expected impact with the target. Internal wiring 326 connects the pair of output terminals 314 to an on-board antenna 328 positioned aft in the projectile's tail section 330. The sensor may or may not be provided with a storage element for "direct" or "integrated" transmission depending upon the application. The antenna is suitably configured to transmit the RF pulse at a center frequency of less than 400 MHz and typically between 100-300 MHz to achieve adequate transmission range.

The crystal 316 is responsive to an impact generated shock wave 332 that propagates at least partially through the crystal to consume and depolarize the crystal and release at least at least a portion of the stored energy to generate a voltage pulse 334 across the output terminals 314 that travels aft along internal wiring 326 to on-board antenna 328 that transmits an RF pulse 336 external to the impact sensor (and projectile) before the sensor is destroyed by the shock wave. As a result of the impact, the sensor (and projectile) will be partially destroyed before the RF pulse is transmitted but the internal wiring, any storage elements and the antenna required to form and transmit the RF pulse survives long enough to transmit RF pulse 336. This is possible in large part because the sensor is passive and requires no processing of the voltage pulse to transmit the RF pulse. Active impact sensors that require on-board processing to transmit a signal are very likely too slow for high velocity impacts.

An off-board RF antenna 340 is positioned to receive RF pulse 336. An off-board computer 342 processes the RF pulse 336 to extract information characterizing the impact. Depending upon the projectile and mission, available a priori information regarding the expected target and whether the RF pulse is a "direct" or "integrated" transmission, the off-board processing may determine impact force, impact velocity, impact angle, target mass, target density, and direct or glancing impact from the characteristics of the RF pulse.

Figure 3A:
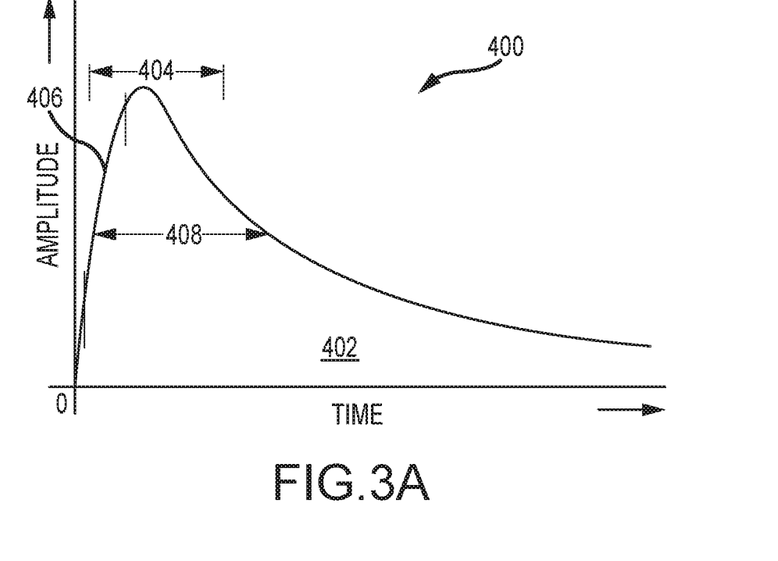
FIGS. 3a and 3b are plots of a direct RF pulse and an integrated RF pulse, respectively.

Referring now to FIG. 3a, release of energy from a crystal is characterized by a "double-exponential" RF pulse representation 400 in which information regarding the release of energy from the crystal, hence information regarding the nature of the impact producing the shock wave to release such information is encoded. A "double-exponential" pulse is defined as having a very sharp leading edge, building up quickly to its maximum level before decaying more slowly. A pulse integral 402 denotes total energy released as an indicator of force of impact, a peak height 404 of the RF pulse denotes a maximum energy release rate from the crystalline structure as an indicator of force of impact, a rise time 406 of the RF pulse denotes an energy release rate as an indicator of impact velocity and a width 408 (typically full-width half-max FWHM) of the RF pulse denotes energy release duration as an indicator of force of impact. Off-board processing can extract these parameters to characterize the impact.

Figure 3B:
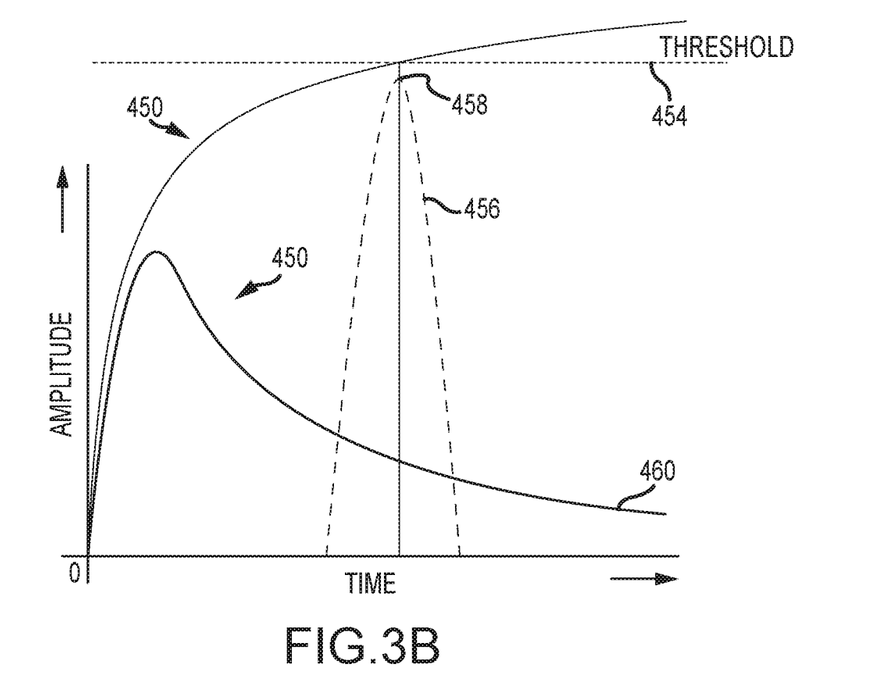

Referring now to FIG. 3b, a voltage-controlled switch (VCS) such as described in U.S. Pat. No. 7,999,445 is configured to store (integrate) energy in a voltage pulse 450 until the stored energy 452 exceeds a threshold 454 and then to release the stored energy in a narrow peak RF pulse 456. Assuming an ideal delta function, the height 458 of the RF pulse 456 denotes total energy released from the crystalline structure (up to tripping the threshold) as an indicator of force of impact. More precisely, assuming all of the stored energy is transmitted in the narrow peak RF pulse 456, the integrated area of the peak pulse should equal the stored energy. Since the transmitted pulse 456 is much narrower than the integration time of the voltage pulse, the peak power of the transmitted RF will be much higher, and thus have a greater transmission range. Other embodiments of the VCS may be employed to, for example, provide pulse shaping. Once the circuit is closed, energy in the tail 460 of the voltage pulse 452 is transmitted. Off-board processing can extract the height 458 of the received RF pulse as an indicator of impact force. The tail 460 can provide additional information on the mechanics of the VCS and its functionality during the impact Other configurations of the storage element based on collection time or energy release rate would produce a similar peak RF pulse, which may capture more of the released energy and more accurately reflect the impact force.

The key would be to know projectile mass/velocity at impact, and if VCS, have an a priori idea of the impact energy required to trip the threshold. From these, you can calculate impact force as the pulse integral. If you had the velocity of the object hit, then you could determine mass of the object from the impact force. Rise time would show change in energy release rate, which would correspond to change in density of the object hit. Pulse peak would correspond to density of object hit.

Figure 4:
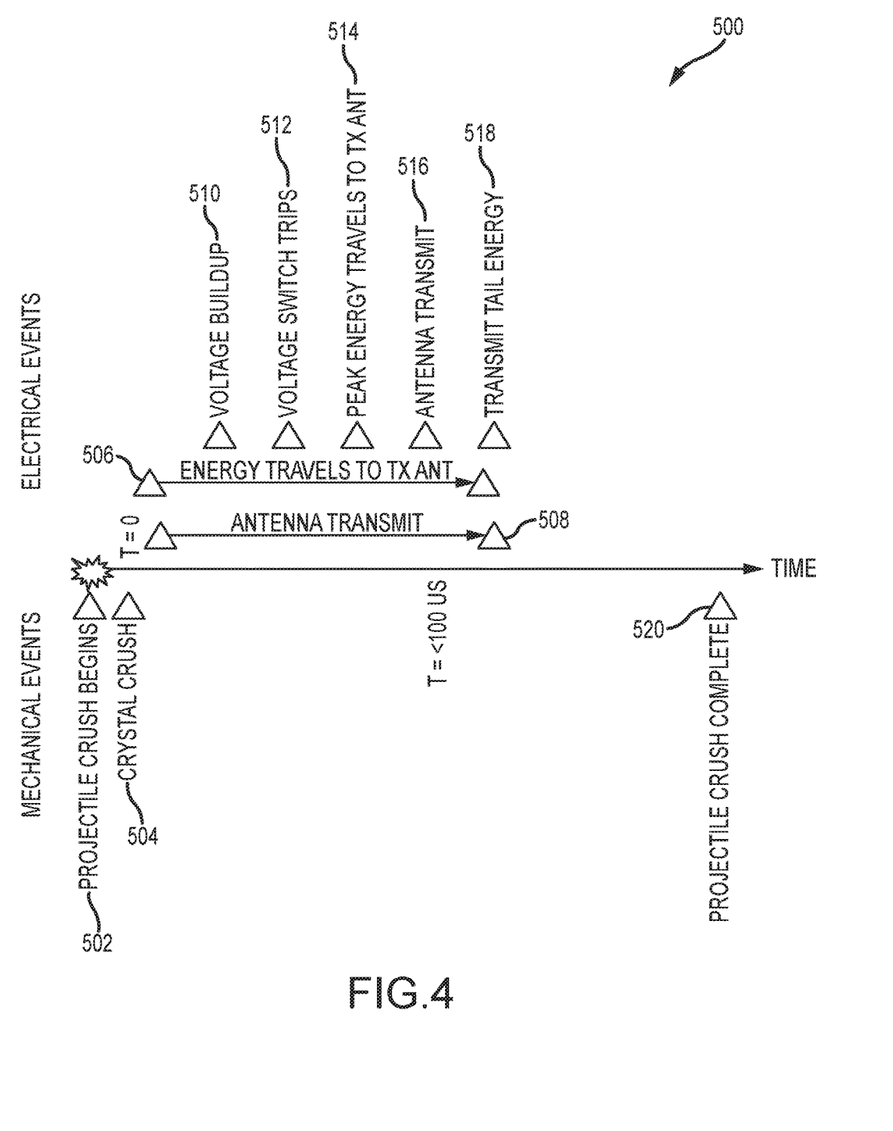
FIG. 4 is a timeline of an embodiment of the mechanical and electrical events associated with impact and the release of stored energy and transmission of either a direct or integrated RF pulse.

Referring now to FIG. 4, an exemplary timeline 500 depicts the mechanical and electrical events associated with impact and the release of stored energy and transmission of either a direct or integrated RF pulse. The precise timing of the events is highly dependent upon many factors including projectile and target mass, closing velocity, length of the projectile, angle of impact, density of the target and target and vehicle structure.

At impact, projectile crush 502 begins, which is followed within microseconds by crystal crush 504 at T=0. For direct transmission, energy 506 in the voltage pulse travels to the on-board antenna and the antenna transmits the RF pulse 508. For integrated transmission, voltage buildup 510 trips the voltage switch 512 generating a narrow peak RF pulse 514 that travels to the on-board antenna and the antenna transmits the RF pulse 516. The antenna also transmits tail energy 518. For a 4 cm crystal at closing speed of 10 km/sec the entire period to form and transmit the RF pulse is less than 100 microseconds. In large part because the sensor is completely passive and does not perform any processing, the release of the stored energy and transmission of RF pulse occurs before the sensor is destroyed by the shock wave. Projectile crush completes 520 at rough T=100 microseconds for a 1 m long projectile.

Figures 5A, 5B:
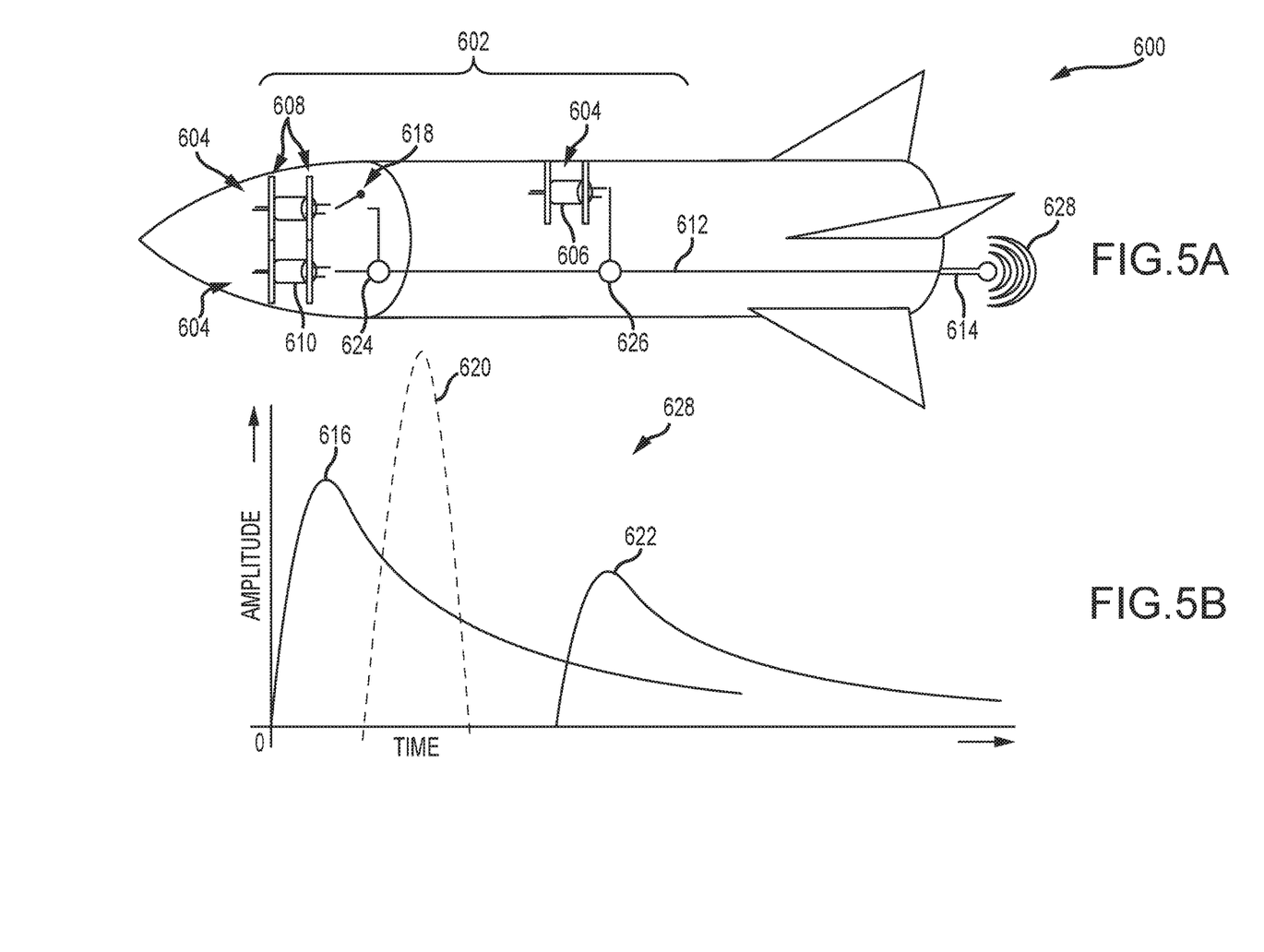
FIGS. 5a and 5b is a diagram of an embodiment of a high velocity projectile including a passive impact sensor having direct and integrated sections distributed fore and aft and a plot of a summed RF pulse, respectively.

Referring now to FIGS. 5a and 5b, a projectile 600 includes a passive impact sensor 602 with multiple energy generating system units 604 distributed for and aft and configured for direct and integrated transmission to both extend transmission range and to more fully characterize impact. Each energy generating system unit 604 includes a crystal 606 sandwiched between a pair of crush plates 608 and a pair of output terminals 610. A pair of units 604 is co-located in a forward position in the projectile's nosecone. One of the units 604 is connected to internal wiring 612 that runs aft along the projectile to an on-board antenna 614 positioned in the projectile's tail section for direct transmission of an RF pulse 616. The other unit 604 is connected through a voltage-controlled switch 618 to the internal wiring 612 for integrated transmission of a narrow peak RF pulse 620. The pair of units 604 are suitably configured to experience nearly identical impact forces. A third unit 604 is positioned aft of the first two and connected to internal wiring 612 for direct transmission of an RF pulse 622. The aft unit would experience different forces than those at the front, presumably lower magnitudes and delayed as some of the energy of the impact has already been absorbed. Summing nodes 624 and 626 sum these RF pulses to transmit a hybrid RF pulse 628. The off-board antenna and processing can extract additional information from the hybrid RF pulse to better characterize both the target and the nature of the impact.

Figure 6A:
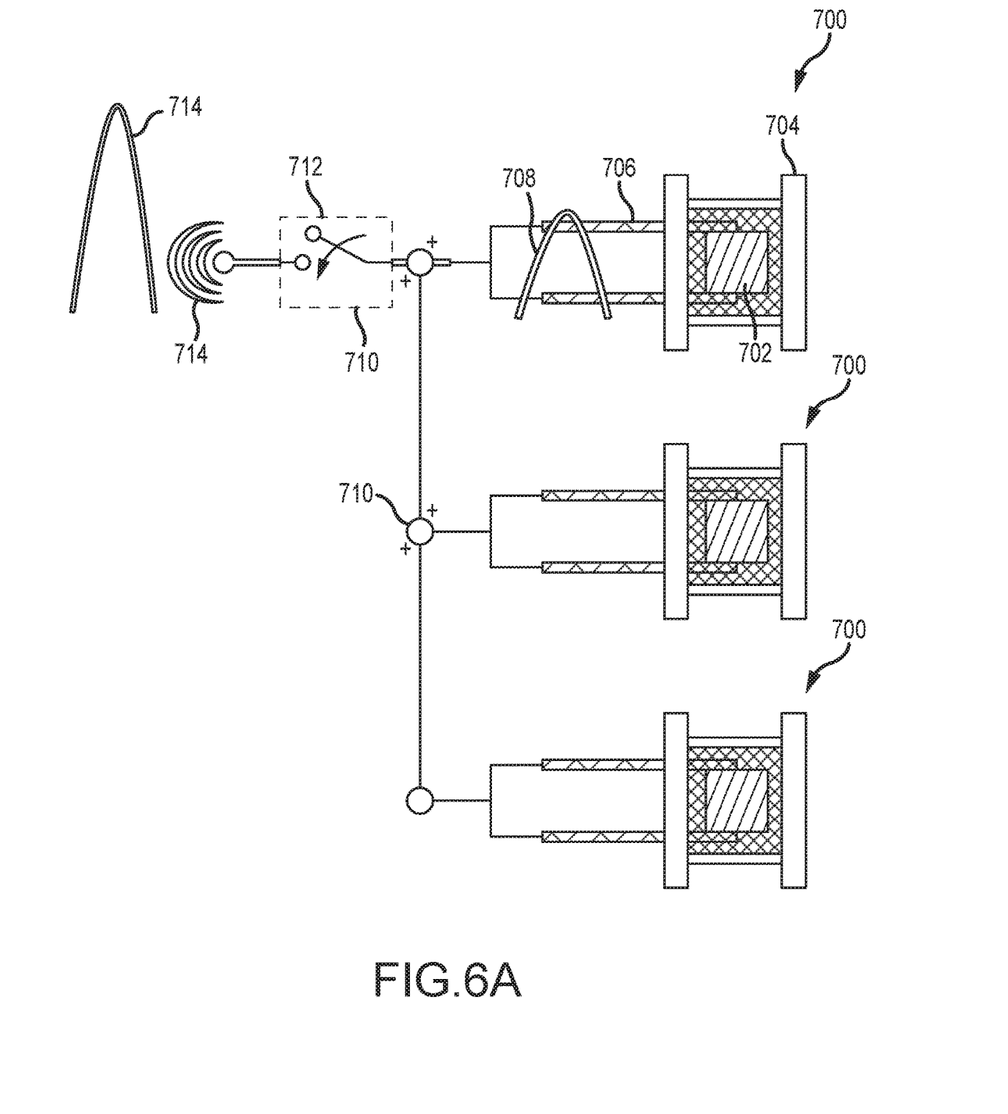
FIGS. 6a and 6b are different embodiments of a passive impact sensor that sums voltage pulses from multiple co-located crystals to extend transmission range.
Figure 6B:
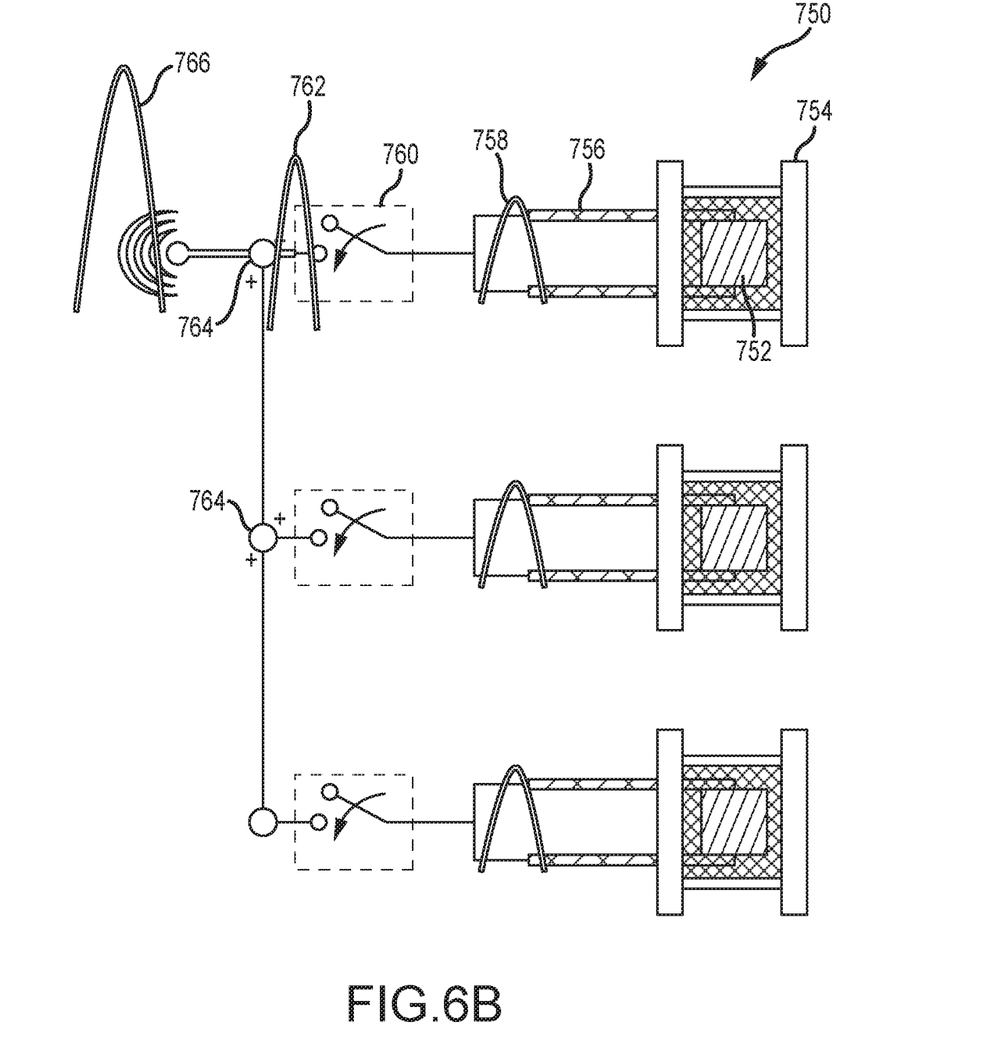

Referring now to FIGS. 6a and 6b, the voltage pulses (direct or integrated) from multiple co-located crystals can be summed to increase transmission range or to more fully characterize impact.

As shown in FIG. 6a, multiple energy generating units 700 (crystal 702, crush plates 704 and output terminals 706) are physically co-located (as best possible) to experience the same impact force. Their voltage pulses 708 are summed at summing junctions 710 and applied to a voltage-controlled switch 712 that integrates the total pulse energy released by all of the crystals 702. The threshold can be set high to maximize the energy in the peak RF pulse 714 for maximum transmission range via on-board antenna 716. Alternately, the threshold can be set low so that any single crystal can trigger transmission of a peak RF pulse (albeit at a lower peak).

As shown in FIG. 6b, multiple energy generating units 750 (crystal 752, crush plates 754 and output terminals 756) are physically co-located (as best possible) to experience the same impact force. Each voltage pulse 758 is applied to a voltage-controlled switch 760 that integrates the pulse energy released by its crystals 752 and generates a narrow peak voltage pulse 762. These voltage pulses are summed at summing junctions 764 to generate a peak RF pulse 766. This configuration provides an opportunity for a higher fidelity impact assessment as the voltage control switch may be non-homogeneous, providing a range of possible outcomes.

Figure 7:
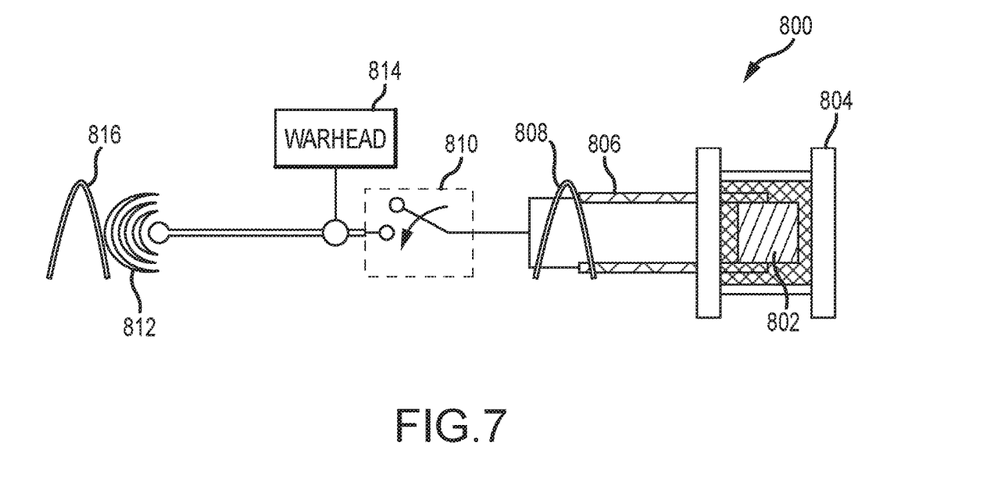
FIG. 7 is a diagram of a passive impact sensor in which the voltage pulse is used to both detonate a warhead and transmit an RF pulse.

Referring now to FIG. 7, a passive impact sensor 800 including a crystal 802 sandwiched between a pair of crush plates 804 and coupled to a pair of output terminals 806 generates a voltage pulse 808. The voltage pulse 808 is coupled, either directly or integrated via VCS 810, to both an on-board transmit antenna 812 and an explosive warhead 814 to transmit an RF pulse 816 and to detonate the explosive warhead 814. Transmission of RF pulse 816 is much faster than detonation of the explosive warhead 814 so the pulse is away before the sensor and projectile are destroyed.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A passive impact sensor, comprising:
a first energy generating system comprised of a crystalline structure that stores latent polarized electrical energy;
a first pair of output terminals coupled to the first energy generating system, said crystalline structure responsive to an impact generated shock wave that propagates at least partially through the crystalline structure to consume and depolarize the crystalline structure and release at least a portion of the stored energy to generate a voltage pulse across the output terminals; and
an antenna configured to transmit an RF pulse responsive to the voltage pulse.

2. The passive impact sensor of claim 1, wherein the crystalline structure is configured such that upon the release of all of the stored energy the generated voltage pulse is at least 10 KV.

3. The passive impact sensor of claim 1, wherein the crystalline structure comprises a ferroelectric ceramic.

4. The passive impact sensor of claim 1, wherein the voltage pulse is directly transmitted as the RF pulse, wherein a pulse integral denotes total energy released as an indicator of force of impact, a height of the RF pulse denotes a max energy release rate from the crystalline structure as an indicator of force of impact, a rise time of the RF pulse denotes an energy release rate as an indicator of impact velocity and a width of the RF pulse denotes energy release duration as an indicator of force of impact.

5. The passive impact sensor of claim 1, further comprising a storage element configured to store energy in the voltage pulse and then to release the stored energy in the RF pulse, wherein a height of the RF pulse denotes total energy released from the crystalline structure as an indicator of force of impact.

6. The passive impact sensor of claim 1, wherein the onboard antenna is configured to transmit the RF pulse at a center frequency of less than 400 MHz.

7. The passive impact sensor of claim 1, wherein the sensor is configured to transmit the RF pulse for impact velocities in excess of 1,000 m/s.

8. The passive impact sensor of claim 1, further comprising:
a second energy generating system comprised of a crystalline structure that stores latent polarized electrical energy, said second energy generating system co-located with said first energy generating system;
a second pair of output terminals coupled to the second energy generating system, said crystalline structure responsive to the same impact generated shock wave that propagates at least partially through the crystalline structure to consume and depolarize the crystalline structure and release at least at least a portion of the stored energy to generate a voltage pulse across the output terminals;
a storage element configured to store energy in the voltage pulse and then to release the stored energy in a peak voltage pulse,
said onboard antenna configured to transmit the RF pulse as a sum of the voltage pulse and the peak voltage pulse.

9. The passive impact sensor of claim 8, further comprising:
a third energy generating system comprised of a crystalline structure that stores latent polarized electrical energy, said third energy generating system positioned aft of said first and second energy generating systems;
a third pair of output terminals coupled to the third energy generating system, said crystalline structure responsive to the same impact generated shock wave that propagates at least partially through the crystalline structure to consume and depolarize the crystalline structure and release at least at least a portion of the stored energy to generate a delayed voltage pulse across the output terminals;

said onboard antenna configured to transmit the RF pulse as a sum of the voltage pulse, the peak voltage pulse and the delayed voltage pulse.

10. The passive impact sensor of claim 1, further comprising:
a second energy generating system comprised of a crystalline structure that stores latent polarized electrical energy, said second energy generating system co-located with said first energy generating system;
a second pair of output terminals coupled to the second energy generating system, said crystalline structure responsive to the same impact generated shock wave that propagates at least partially through the crystalline structure to consume and depolarize the crystalline structure and release at least at least a portion of the stored energy to generate a voltage pulse across the output terminals;
said onboard antenna configured to transmit the RF pulse as a sum of the voltage pulses.

11. The passive impact sensor of claim 10, further comprising:
one or more storage elements configured to store energy in either each said voltage pulse or the sum and then to release the stored energy in a peak voltage pulse,
said onboard antenna configured to transmit the peak voltage pulse as the RF pulse.

12. The passive impact sensor of claim 1, further comprising:
one or more crush plates positioned to forward and aft of the crystalline structure.

13. A passive impact sensor, comprising:
a projectile configured to explode, destroy with kinetic energy, embed or pass through an object with a closing velocity greater than 1,000 m/s;
a first energy generating system comprised of a crystalline structure that stores latent polarized electrical energy and a first pair of output terminals, said crystalline structure responsive to an impact generated shock wave that propagates at least partially through the crystalline structure to consume and depolarize the crystalline structure and release at least a portion of the stored energy to generate a voltage pulse across the output terminals; and
an antenna configured to transmit an RF pulse responsive to the voltage pulse external to the impact sensor before the projectile is destroyed.

14. The passive impact sensor of claim 13, wherein the onboard antenna is configured to transmit the RF pulse at a center frequency of less than 400MHz.

15. The passive impact sensor of claim 13, further comprising:
a second energy generating system comprised of a crystalline structure that stores latent polarized electrical energy, said second energy generating system co-located with said first energy generating system at a forward position on the projectile;
a second pair of output terminals coupled to the second energy generating system, said crystalline structure responsive to the same impact generated shock wave that propagates at least partially through the crystalline structure to consume and depolarize the crystalline structure and release at least at least a portion of the stored energy to generate a voltage pulse across the output terminals;
a storage element configured to store energy in the voltage pulse and then to release the stored energy in a peak voltage pulse,
said onboard antenna configured to transmit the RF pulse as a sum of the voltage pulse and the peak voltage pulse.

16. The passive impact sensor of claim 15, further comprising:
a third energy generating system comprised of a crystalline structure that stores latent polarized electrical energy, said third energy generating system positioned aft of said first and second energy generating systems on the projectile;
a third pair of output terminals coupled to the third energy generating system, said crystalline structure responsive to the same impact generated shock wave that propagates at least partially through the crystalline structure to consume and depolarize the crystalline structure and release at least at least a portion of the stored energy to generate a delayed voltage pulse across the output terminals;
said onboard antenna configured to transmit the RF pulse as a sum of the voltage pulse, the peak voltage pulse and the delayed voltage pulse.

17. The passive impact sensor of claim 13, further comprising:
a second energy generating system comprised of a crystalline structure that stores latent polarized electrical energy, said second energy generating system co-located with said first energy generating system;
a second pair of output terminals coupled to the second energy generating system, said crystalline structure responsive to the same impact generated shock wave that propagates at least partially through the crystalline structure to consume and depolarize the crystalline structure and release at least at least a portion of the stored energy to generate a voltage pulse across the output terminals;
said onboard antenna configured to transmit the RF pulse as a sum of the voltage pulses.

18. The passive impact sensor of claim 13, further comprising:
an explosive warhead, wherein said voltage pulse is coupled to the explosive warhead to detonate the explosive warhead on impact.

* * * * *